United States Patent
McGlinchy

(10) Patent No.: US 8,015,763 B2
(45) Date of Patent: Sep. 13, 2011

(54) MULTIPLE CONFIGURATION JOINER CLIP

(75) Inventor: Timothy B. McGlinchy, Twinsburg, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 76 days.

(21) Appl. No.: 12/326,142

(22) Filed: Dec. 2, 2008

(65) Prior Publication Data

US 2009/0282772 A1 Nov. 19, 2009

Related U.S. Application Data

(60) Provisional application No. 61/052,685, filed on May 13, 2008.

(51) Int. Cl.
*E06B 3/964* (2006.01)
(52) U.S. Cl. .................. 52/204.61; 52/456; 52/656.9
(58) Field of Classification Search .................. 52/456, 52/655.1, 656.9, 665, 98, 204.61; 403/264, 403/280, 294, 298, 297, 453; 29/289, 291–293, 29/297
See application file for complete search history.

(56) References Cited

U.S. PATENT DOCUMENTS

| | | | | |
|---|---|---|---|---|
| 2,771,110 A | * | 11/1956 | Tuck | 52/98 |
| 5,177,920 A | * | 1/1993 | Rafeld | 52/314 |
| 6,131,356 A | * | 10/2000 | Gieseke | 52/656.5 |
| 6,244,012 B1 | | 6/2001 | McGlinchy et al. | |
| 6,301,843 B1 | * | 10/2001 | Silverman | 52/204.5 |
| 7,124,546 B2 | * | 10/2006 | Scharff et al. | 52/314 |
| 2008/0040995 A1 | | 2/2008 | Briese et al. | |

* cited by examiner

*Primary Examiner* — Brian E Glessner
*Assistant Examiner* — Adam Barlow
(74) *Attorney, Agent, or Firm* — Tarolli, Sundheim, Covell & Tummino LLP

(57) ABSTRACT

A muntin bar joiner clip having a relatively flat, thin body and first and second muntin bar engagement legs extending from the body. These legs extend along a longitudinal axis of said joiner clip. The body has opposite sides defining substantially parallel major surfaces having substantially parallel opposite edges extending substantially parallel to the axis. A region of weakness such as a line of weakness allows the body to be separated into two portions between the first and second legs. One or more muntin bar abutments project from said body in a direction transverse to the axis and each abutment includes a muntin bar abutment face oriented in a direction transverse to said axis.

5 Claims, 2 Drawing Sheets

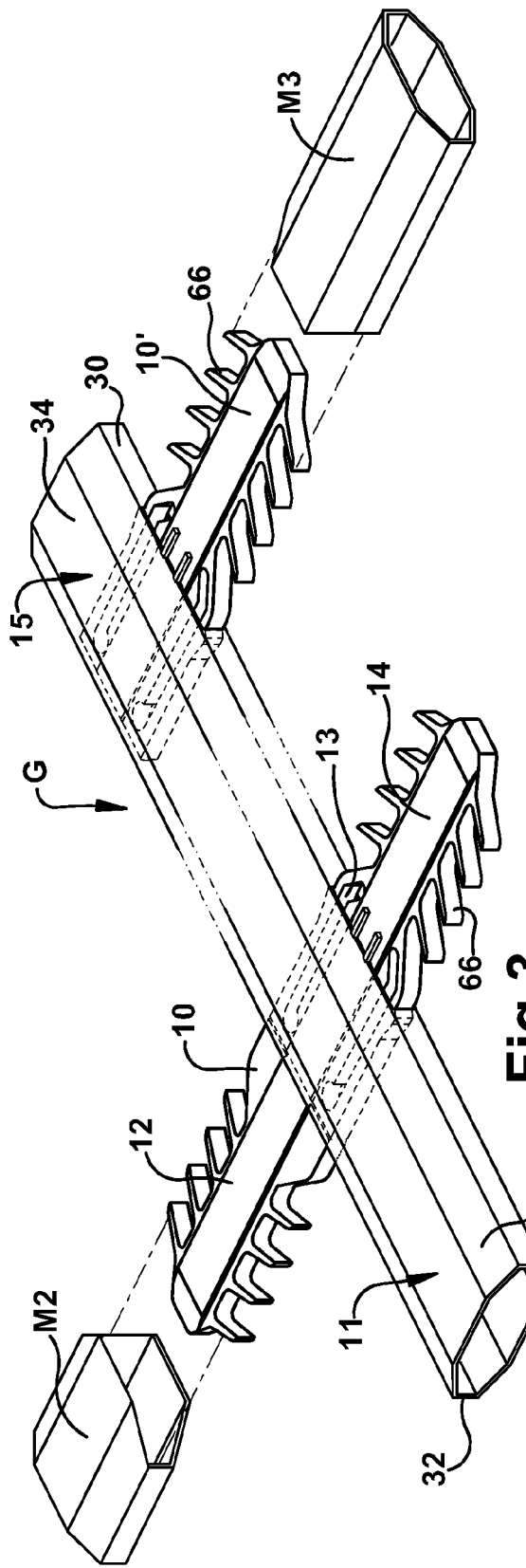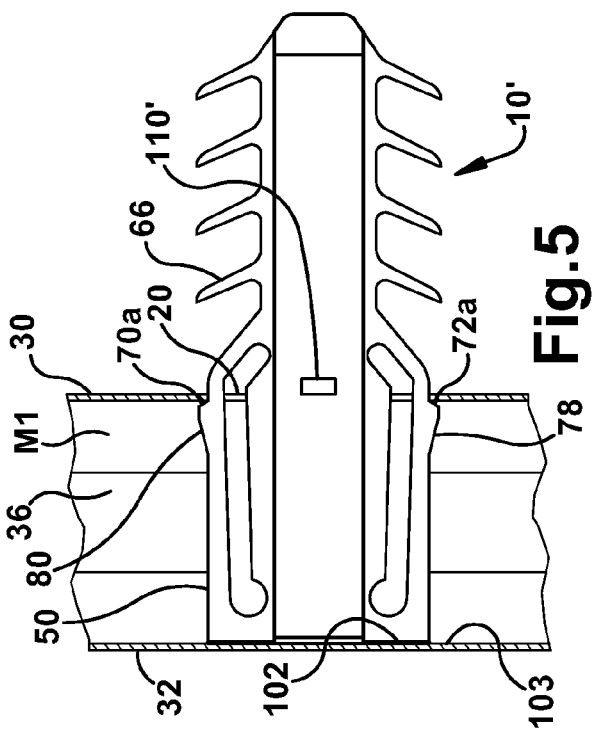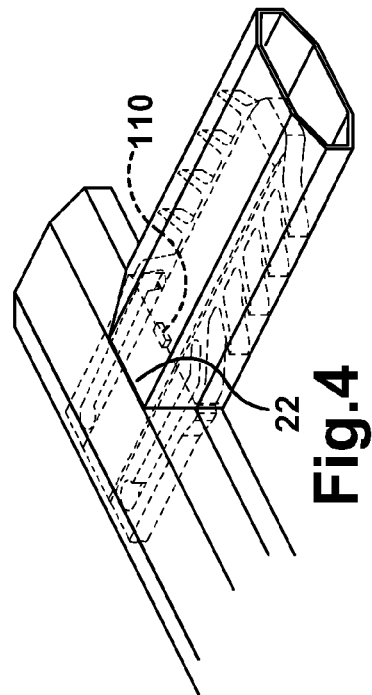

MULTIPLE CONFIGURATION JOINER CLIP

CROSS REFERENCE TO RELATED APPLICATIONS

The following application claims priority to Provisional application Ser. No. 61/052,685 filed May 13, 2008, and is incorporated herein by reference in its entirety for all purposes.

FIELD OF THE INVENTION

The present invention concerns a joiner clip for attaching together two muntin bars mounted between two glass lites in an insulating glass unit.

BACKGROUND OF THE INVENTION

A joiner clip is depicted in U.S. Pat. No. 6,244,012. The '012 patent is assigned to the assignee of the present invention and is incorporated herein by reference. The muntin bar joiner clip disclosed in the '012 patent is a relatively flat, thin body. A first muntin bar engagement leg extends from one end of the body and a second muntin bar engagement leg extends from an opposite end of the body. The muntin bar engagement legs extend along a longitudinal axis of the clip and the one or more abutments extend from the body transverse to the axis. The joiner has opposite body sides that define substantially parallel major surfaces and opposite edges that are substantially parallel and extend substantially parallel to the axis. Different embodiments are disclosed in which the abutments extend from body sides or body edges.

Pending application Ser. No. 11/505,042, published as application 2008/0040995 entitled "Muntin Bar clip and Muntin Bar Assembly" concerns a method and apparatus for making a muntin bar assembly or grid. A tubular muntin bar grid has a first muntin bar formed from an elongated tube having ends that engage a window spacer frame and include side walls that have relatively narrow top and bottom planar walls and relatively wider side planar walls. The top and bottom planar walls defining one or more slots that define intersecting muntin bar positions. One or more intersecting muntin bars formed from elongated tubes have ends that engages the first elongated muntin bar in a region of a slot. The grid includes one or more joiner clips for positioning the one or more intersecting muntin bars in relation to the first muntin bar. Each joiner clip has a tree portion that extends into one end of the intersecting muntin bars to support the intersecting muntin bars in relation to the first muntin bar and an anchor portion which extends into a slot of the first muntin bar and connects to a wall of the first muntin bar spaced from a wall of the first muntin bar contacted by an associated intersecting muntin bar which engages the tree portion of the joiner clip. The anchor portion includes either an integral tab which traps the wall of the muntin bar between a flexible finger or a separate tab which is mounted to a clip base that defines the flexible finger.

SUMMARY OF THE INVENTION

The presently disclosed joiner clip has a stress riser, or weakened region, at which the clip can be broken into two pieces easily by flexing or bending by hand. If the clip is left unbroken, it can be used as a standard joiner clip functioning as explained in U.S. Pat. No. 6,244,012. If the clip is broken into two pieces, one piece is discarded and the other is used to fabricate a valance, or tee-grid pattern described in published application number 2008/0040995.

These and other objects, advantages and features of the invention will be described in conjunction with the accompanying drawings.

BRIEF DESCRIPTION OF THE DRAWINGS

FIG. 3 is a perspective view of a muntin grid;
FIG. 4 is a perspective view of a portion of the grid with intersecting contour muntin bars attached by means of a valence clip;
and
FIG. 5 is a partially section view of a muntin bar showing a plan view of a valance clip.

EXEMPLARY MODE FOR PRACTICING THE INVENTION

Figure 1:
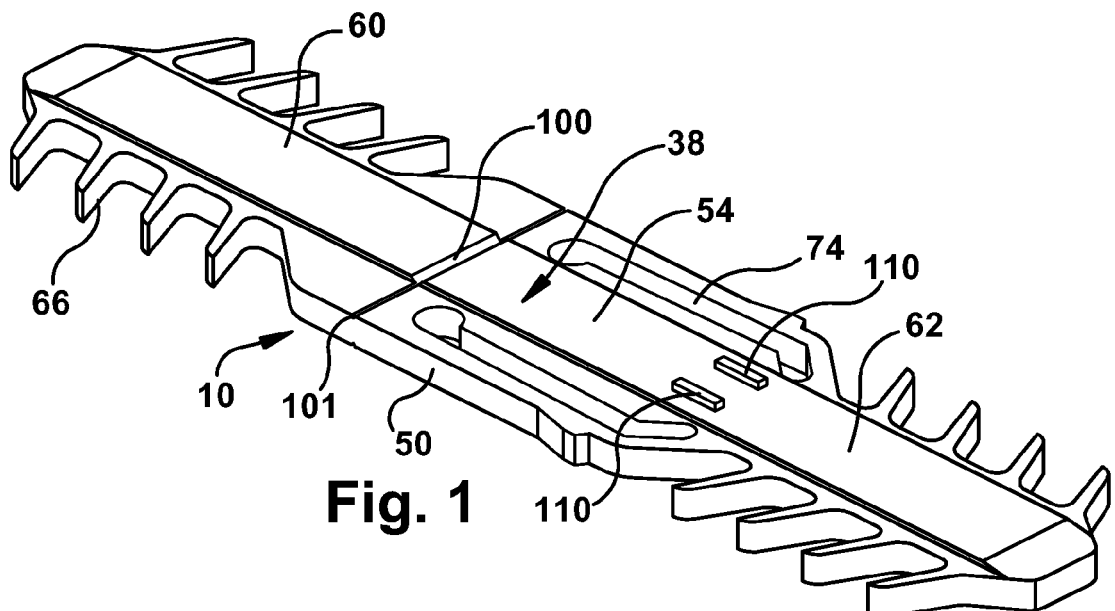
FIG. 1 is a perspective view of an exemplary joiner clip.
Figure 1A:
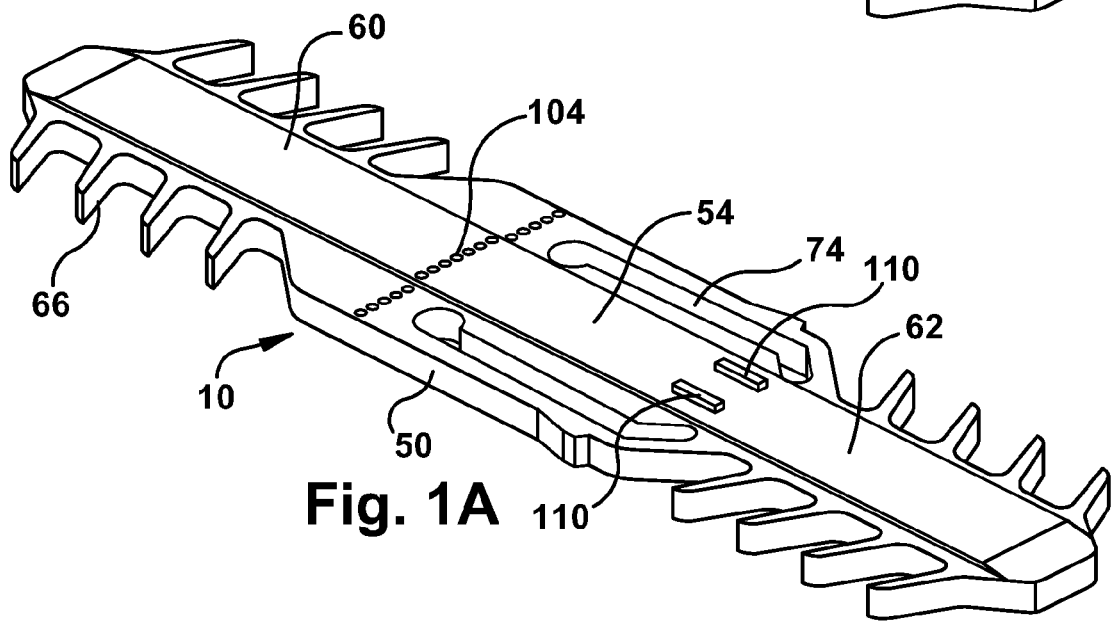
FIG. 1A is a perspective view of an alternate joiner clip.

FIGS. 3-5 depict a contour muntin bar grid G made up of multiple contour muntin bars M1, M2, M3. U.S. Pat. No. 6,438,819 describes a contour muntin bar and is incorporated herein by reference. Two molded plastic muntin bar clips 10, 10' are shown in the drawings. In one use shown in FIG. 3, the clip 10 extends into an opening 13 at a first end 11 of the muntin bar M1 and out an opening (not shown) on an opposite side of the muntin bar M1. It supports intersecting muntin bars on both sides of the muntin bar M1. In the FIG. 3 depiction, one bar M2 of two such intersecting bars is shown being inserted over a first clip portion 12. A second intersecting muntin bar (not shown) is inserted over a second, exposed portion 14 that extends from an opposite side of the muntin bar M1. To accommodate insertion of the clip 10, the muntin bar M1 has two openings that define a throughpassage for insertion of the clip.

Figure 2:
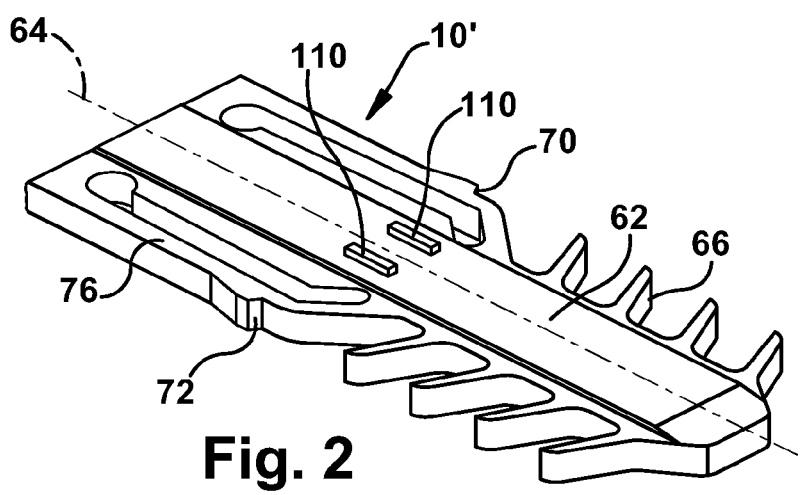
FIG. 2 is a perspective view showing a portion of the FIG. 1 joiner clip separated to form a valence clip.

At an opposite end 15 of the muntin bar M1, the muntin bar is pierced through only one side with an opening 20 (FIG. 5) to accommodate the clip 10' depicted in FIG. 2. The clip 10' is inserted into the single opening 20 and used to produce a valance grid pattern, or tee-intersection joint 22. Once the muntin bar M3 is attached, no portion of the plastic clip 10' is exposed to view within the finished window assembly, into which the grid G is inserted.

The first tubular muntin bar M1 has oppositely facing relatively narrow sides 30, 32 that form outwardly facing surfaces having openings at positions where intersecting muntin bars attach. Relatively wider sides 34, 36 are generally parallel to the surfaces of lites (not shown) that bound the grid G in an assembled insulating glass unit.

The clip 10 includes a flat, thin joiner clip body having a longitudinal axis with opposite edges 50, extending in the direction of the axis and opposite sides defining major faces 54. A clip body 38 extends transverse to a supporting muntin bar M1 through two similar openings in the case of the clip 10 and into one opening 20 in the case of the clip 10'. The clip body 38 has an elongated spine that defines two legs 60, 62 that telescope into corresponding first and second intersecting muntin bars. As seen in the drawings each of the legs supports angled fingers 66 that extend outwardly from opposite sides of the joiner clip a sufficient distance to engage the intersecting muntin bars and maintain an attached muntin bar aligned with an elongated clip axis 64 in fixed relationship within a grid G of the muntin bars.

Abutments 70, 72 extend from said body in a direction transverse to the axis 64. The abutment 70 has an abutment face 70a oriented in a direction transverse to the axis 64 and the abutment 72 has an abutment face 72a. The abutments engage the muntin bar M1 and lock the joiner clip 10 to the muntin bar M1. Elongated flexible biasing members or springs 74, 76 are attached to the clip body at spaced locations and define the abutments. These springs include ramps 78, 80 for making a secure engagement with the first muntin bar. The clip 10 is inserted into the opening 13 in the side of the muntin bar and pushed through an aligned corresponding opening (not shown) on an opposite side of the muntin bar. The ramps 78, 80 engage the walls surrounding the first opening and bias the abutment inward allowing the abutments to pass through the opening. Once the abutment passes through the first opening, it springs out and traps the clip in place for attachment of the intersecting muntin bars. At the position the biasing members spring back into their unflexed configuration. Two bosses 110 extend away from a surface or face 54 come into contact with the muntin bar M1 and help prevent the clip from passing further into the muntin bar M1. When installed in this manner the wall 30 (FIG. 5) is trapped between and in engagement with abutments 70, 72, 110 on both its inner and outer surfaces.

As seen most clearly in FIG. 1, the body has two lines of weakness 100 (top and bottom) that are formed in the clip body 38 during a molding process. By flexing the clip about this line of weakness 100, one end of the clip is detached from the other and the resulting clip 10' (FIG. 2) can be used as a valence or T clip. The clip body 38 includes a center spine running the length of the clip and a notch 101 that defines the region of weakness 100. The notch is deep enough to extend though the spine to a portion of the clip having a thickness the same as the legs that defines the fingers 66 for engaging the inner surfaces of the intersecting muntin bars. In the exemplary embodiment, a line of weakness disrupts opposed top and bottom surfaces of the body but could also extend into the edges 50 of the clip body. As seen in FIG. 5, when the clip 10' is formed by separating the clip 10 along its line of weakness 100, a generally planar end 102 of the clip is formed. This end 102 abuts an inner wall 103 of the muntin bar M1 when the clip is locked in place. The movement of either style clip 10, 10' as it is inserted into the muntin bar M1 is limited by one or more bosses 110, 110' that extend away from the surface or face 54 of the spine. As the clip 10' (FIG. 1) is pushed into the muntin bar, two bosses 110 engage a narrow side 30 of the muntin bar in the region of the opening 20. The joiner clip of FIG. 5 has a single boss 110'.

The depth into the body of the clip of the region of weakness is sufficient to allow the clip 10 to be flexed and separated or detached to form the clip 10'. In the exemplary embodiment the region of a weakness is a notch 101 that extends across the clip body but spaced apart holes 104 could also be used. The depth of the region can vary with the material so that a polycarbonate clip might have a different depth from that used with Nylon depending on the fracture characteristics of these materials.

The exemplary embodiment has been described with a degree of particularity, but it is the intent that the disclosure encompass all modifications and alterations from the exemplary design falling within the spirit or scope of the appended claims.

What is claimed:

1. A multi-configuration muntin bar joiner clip for connecting two muntin bars to opposite sides of a third muntin bar having two side wall openings of generally the same width extending through the opposite sides of said third muntin bar in a first configuration and for connecting one muntin bar at right angles to a second muntin bar having a side wall opening located along a length of said second muntin bar at a region of contact with said first muntin bar in a second, altered configuration, said joiner clip comprising:
    a) a relatively flat, thin body for insertion into an interior of a muntin bar through a side wall opening and having i) opposite major faces, ii) substantially parallel side edges extending between ends of the body; and iii) a v-shaped notch that extends into one of the major faces of the body across a width of said body for separating the body into two body parts at a region of the v-shaped notch with one body part forming part of the second, altered configuration of said joiner clip having one end that extends across the body along the region of the v-shaped notch for insertion through the side wall opening of the second muntin bar; and one or more muntin bar abutments projecting from said flat, thin body for engaging an edge of the side wall opening of the second muntin bar to impede separation of the clip from the second muntin bar;
    b) a first muntin bar engagement leg extending from one end of said flat, thin body; and
    c) a second muntin bar engagement leg extending from an end of said flat, thin body opposite to said one end;
    d) said muntin bar engagement legs extending along a longitudinal axis of said joiner clip.

2. A multi-configuration muntin bar joiner clip for connecting two muntin bars to opposite sides of a third muntin bar having two side wall openings of generally the same width extending through the opposite sides of said third muntin bar in a first configuration and for connecting one muntin bar at right angles to a second muntin bar having a side wall opening located along a length of said second muntin bar at a region of contact with said first muntin bar in a second, valence clip configuration, said joiner clip comprising:
    a) a relatively flat, thin body having opposite major faces and substantially parallel side edges extending between ends of the body having a line of weakness that extends into but not through a major face of the thin body generally perpendicular to the parallel side edges and which separates the body into two body parts having the same thickness on opposite sides of the line of weakness with one body part forming a portion of a valance clip having a generally planar end in the region of the line of weakness which extends across a width of said body and that is bound on either side by the parallel side edges of at least a portion of the flat, thin body;
    b) a first muntin bar engagement leg continuous with the flat, thin body and extending from one end of said flat, thin body;
    c) a second muntin bar engagement leg continuous with the flat, thin body and extending from an end of said flat, thin body opposite to said one end;
    d) said muntin bar engagement legs extending along a longitudinal axis of said joiner clip; and,
    e) one or more abutments extending from said body in a direction transverse to said axis for engagement with a muntin bar to impede the body against movement in the direction of the axis.

3. The joiner clip of claim 2 wherein the line of weakness is formed by a notch that extends into a major face of the relatively flat thin body.

4. A multi-configuration muntin bar joiner clip for connecting two muntin bars to opposite sides of a third muntin bar having two side wall openings of generally the same width extending through the opposite sides of said third muntin bar in a first configuration and for connecting one muntin bar at right angles to a second muntin bar having a side wall opening located along a length of said second muntin bar at a region of contact with said first muntin bar in a second, valence clip configuration, said joiner clip comprising:

a) a relatively flat, thin body for insertion into an interior of a muntin bar through a side wall opening and having i) opposite major faces, ii) substantially parallel side edges extending between ends of the body; and iii) three or more spaced apart depressions that extend into a major face of said body and are aligned to form a line of weakness that extends transverse to the substantially parallel side edges across a width of said body, said three or more depressions spaced apart sufficiently close for separating said body into two parts along the line of weakness with one part forming a valance joiner clip having a generally planar end at a region of the spaced apart depressions that extends across a width of the body from one side edge to a spaced apart side edge where the two parts separate for insertion through the side wall opening of the second muntin bar; and one or more muntin bar abutments projecting from said thin body for engaging an edge of the side wall opening of a the second muntin bar to impede separation of the joiner clip from the second muntin bar;

b) a first muntin bar engagement leg extending from one end of said flat, thin body which forms part of the valance clip; and c) a second muntin bar engagement leg extending from an end of said flat, thin body opposite to said one end not forming part of the valance clip;

d) said muntin bar engagement legs extending along a longitudinal axis of said joiner clip.

5. The joiner clip of claim 4 wherein the three or more depressions extend completely through the clip body to form holes.

\* \* \* \* \*